United States Patent [19]

Cunningham

[11] 4,330,254
[45] May 18, 1982

[54] EXTRUSION DIE CONVERSION

[75] Inventor: George M. Cunningham, Horseheads, N.Y.

[73] Assignee: Corning Glass Works, Corning, N.Y.

[21] Appl. No.: 950,992

[22] Filed: Oct. 13, 1978

Related U.S. Application Data

[62] Division of Ser. No. 854,716, Nov. 25, 1977, Pat. No. 4,139,144.

[51] Int. Cl.³ .......................... B28B 21/52; B29F 3/04
[52] U.S. Cl. ................................ 425/466; 252/477 R; 425/192 R; 425/464
[58] Field of Search ............... 425/466, 190, 191, 192, 425/464

[56] References Cited

U.S. PATENT DOCUMENTS

| 1,138,101 | 5/1915 | Gammel | 425/467 |
| 1,487,378 | 3/1924 | Gigliotti | 425/190 |
| 1,508,186 | 9/1924 | Healey | 425/466 |
| 2,875,497 | 3/1959 | Barnhart | 425/190 |
| 2,982,995 | 5/1961 | Groleau | 425/466 |
| 3,611,491 | 7/1969 | Rector | 425/466 |
| 3,899,326 | 8/1975 | Frost | 264/177 R |
| 3,983,283 | 9/1976 | Bagley | 264/177 R |

Primary Examiner—Wilbert J. Briggs, Sr.
Assistant Examiner—A. H. Koeckert
Attorney, Agent, or Firm—Burton R. Turner

[57] ABSTRACT

Certain portions of the discharge slots of an existing extrusion die for forming honeycomb structures are blocked off by selectively positioning a plurality of tabs within such discharge slots so as to convert the cellular configuration originally formed by the discharge slots of such die to that of a desired cellular configuration.

5 Claims, 13 Drawing Figures

EXTRUSION DIE CONVERSION

This is a division of application Ser. No. 854,716, filed Nov. 25, 1977, now U.S. Pat. No. 4,139,144.

BACKGROUND OF THE INVENTION

In the formation of extrusion dies for making honeycomb structures, the outlet face may be formed with a plurality of saw cuts such as disclosed in U.S. Pat. No. 3,790,654, where the cell pattern to be formed includes continuous linear walls extending transversely across the honeycomb structure, such as when forming honeycomb structures with square, rectangular or triangular cell shapes. However, when the desired cell configuration includes shapes wherein the bounding walls of the cells do not linearly extend transversely across the honeycomb structure, such as the brickwork shape of FIG. 4 and the T-shape of FIG. 8 of U.S. Pat. No. 3,899,326, methods other than saw cuts must be utilized to form the cell pattern. Such methods may include the incorporation of a plurality of individual cores or pins which are manually positioned on a die body and bolted thereto as shown in U.S. Pat. No. 2,908,037, or the die may be formed of a plurality of laminated etched sheets of photosensitive glass or glass-ceramic materials as disclosed in U.S. Pat. No. 3,846,197. However, the use of individually positioned core pins which are bolted to a die body not only requires the precise drilling and tapping of each individual hole for applying the core pins, but is also costly and time consuming to manufacture. Further, the use of laminated etched photosensitive glass and glass-ceramic materials for forming a die is also not only expensive and time consuming to manufacture, but is not particularly durable when extruding abrasive or viscous materials.

Accordingly, the present invention has overcome the problem of forming an extrusion die for making honeycomb structures by initially utilizing a conventional saw-cut die and selectively positioning a plurality of tab members in certain portions of the discharge slots of such die so as to convert the cellular structure originally produced thereby into that of a different desired structure.

SUMMARY OF THE INVENTION

In its very simplest form, the present invention is directed to the conversion of the honeycomb pattern produced by an extrusion die having interconnected discharge slots, by the insertion of a plurality of inserts which selectively close off certain portions of such discharge slots so as to provide a different honeycomb structure wherein the bounding walls of the cells do not linearly extend transversely across the honeycomb structure. As pointed out in U.S. Pat. No. 3,790,654, a conventional die may be formed by saw-cutting intersecting discharge slots in the outlet face of a die, and drilling feed holes in the inlet face thereof which communicate with the intersecting slots. As shown in such patent, the continuous intersecting slots may form a die for making honeycomb articles having square or rectangular cells, with the bounding walls thereof linearly extending transversely across the honeycomb structure. However, as previously pointed out, where the desired cell shape is in the form of a "brickwork", a "T", a "plus", or an "L", the bounding walls of such cells do not linearly extend transversely across the cellular structure, and it is impossible to produce the die by such relatively inexpensive conventional transverse saw cuts.

However, the novel process of the present invention for forming an extrusion die initially includes the provision of a die body having interconnecting discharge slots which are formed in a conventional manner. In order to modify the cellular pattern produced by the discharge slots, a plurality of insert or tab means are positioned in a selected orientation within portions of such discharge slots so as to block off the same and convert the die to provide a different cellular configuration. The inserts or tabs have at least one leg portion insertable within a portion of the discharge slots, and preferably have an attachment portion which overlies a portion of the outlet face of the pins formed intermediate such slots. The tabs having an attachment portion are preferably secured to such outlet face by resistance welding, brazing, or other suitable bonding techniques.

By selecting the positionment and orientation of the various tab members, it is possible to convert a conventional die having interconnected discharge slots with quadrilateral die pins therebetween arranged to form quadrilateral cells such as a square-celled honeycombed structure, into a discharge arrangement for forming polygonal cells such as L-shaped, T-shaped, Z-shaped, +-shaped, brickwork-shaped and flexible rectangle-shaped cellular structures, all without resorting to expensive machining or specialized pin manufacturing techniques. The polygonal shaped cells may have a number of walls which is a multiple of the number of walls forming the cells of the initial discharge pattern times a positive integer.

It thus has been an object of the present invention to provide a novel relatively easily manufacturable extrusion die structure for forming thin walled honeycomb articles having a plurality of openings extending therethrough with bounding walls which do not continuously extend linearly across such articles.

A further object of the invention has been to provide an improved method of forming an extrusion die for extruding honeycomb articles with various shapes, wherein a plurality of tabs are positioned in a desired orientation within the discharge slots of a conventional die to thereby block off such slots and convert such conventional die to provide honeycomb structures with desired cellular configurations.

DESCRIPTION OF THE PREFERRED EMBODIMENTS

Figure 1:
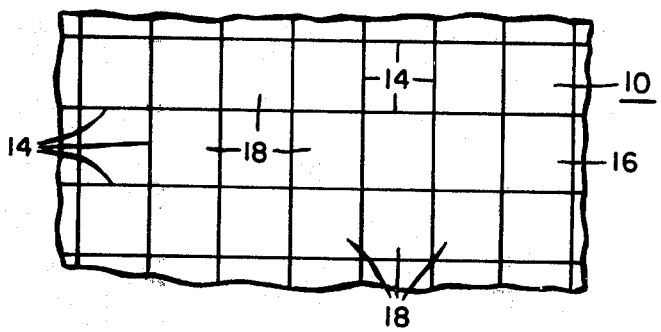
FIG. 1 is a schematic fragmental illustration of the discharge slots of an outlet face of a conventional die for forming a honeycomb structure with a square cellular pattern.
Figure 2:
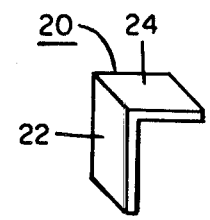
FIG. 2 is a perspective view of one form of a tab member embodying the present invention.
Figure 3:
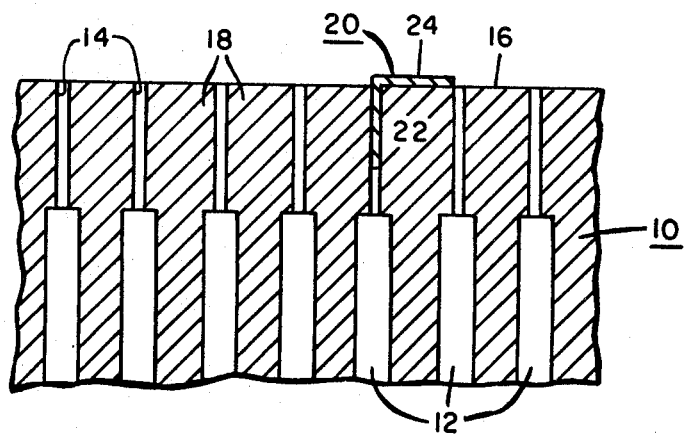
FIG. 3 is a fragmental side elevational view in section of a conventional die such as shown in FIG. 1, having a tab such as shown in FIG. 2 inserted therein.

Referring now particularly to FIGS. 1 through 5 inclusive, a conventional die 10 to be modified is shown having a plurality of feed holes 12 communicating with a plurality of interconnected discharge slots 14 for forming a honeycomb structure having a square cellular pattern. The discharge slots 14 communicate with the outlet face 16 of the die 10 and form a plurality of cores or die pins 18 therebetween. In fact, it is the shape of the die pins 18 which determines the shape of the cellular structure formed by the die 10.

Figure 4:
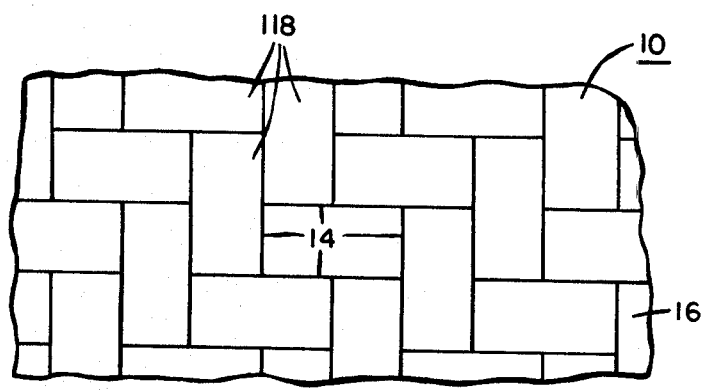
FIG. 4 is a schematic fragmental representation of an outlet face of a die for forming a cellular honeycomb structure with a flexible rectangle cellular configuration.

In order to convert die 10 from the square cell discharge configuration as shown in FIG. 1 to a flexible rectangle configuration as shown in FIG. 4, a plurality of tab members 20 are utilized to block off portions of the discharge slots 14 to thus, in essence, form rectangular shaped die pins 118 in the outlet face 16 of the die. The tab members 20 have an insert portion 22 which projects within slots 14 and an attachment portion 24 which may be welded, brazed, or otherwise suitably bonded to the outlet face 16 of pins 18 as illustrated by a single tab member in FIG. 3.

Figure 5:
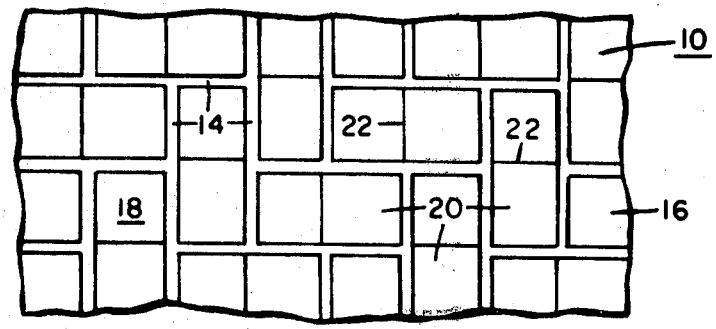
FIG. 5 is a fragmental plan view of the outlet face of the die shown in FIG. 3 having a plurality of tabs as shown in FIG. 2 for forming the outlet configuration shown in FIG. 4.

As shown in FIG. 5, a plurality of tabs 20 are positioned in selective orientation on the outlet face 16 of die 10 to close off desired portions of the discharge slots 14. In essence, by so blocking off such portions of the discharge slots 14, the square die pins 18 of FIG. 1 are converted into flexible rectangular die pins 118 of FIG. 4, thereby providing a die for forming a honeycomb structure having cells in the form of such flexible rectangles.

Figure 6:
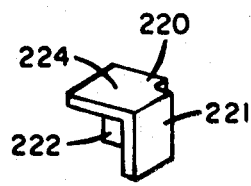
FIG. 6 is a perspective view of a further embodiment of a tab member forming a part of the present invention.
Figure 7:
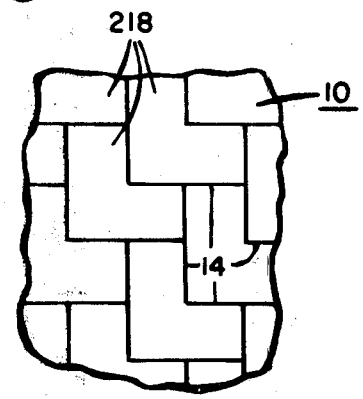
FIG. 7 is a fragmental schematic view of an outlet face of a die showing a discharge slot configuration for forming a honeycomb structure with L-shaped cells.
Figure 8:
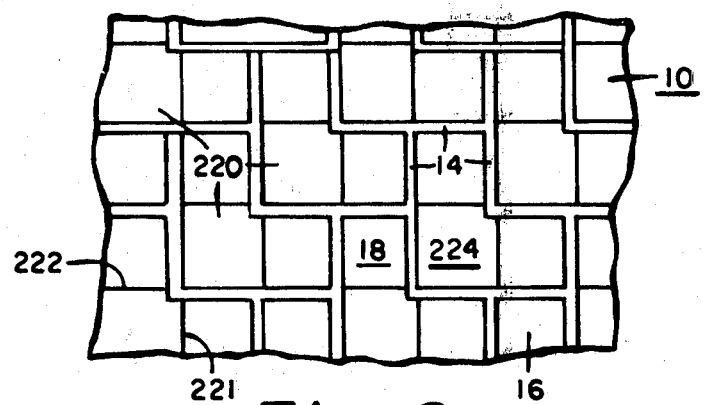
FIG. 8 is a fragmental plan view of the outlet face of a die such as shown in FIG. 3 having a plurality of tabs such as shown in FIG. 6 for forming an outlet configuration as shown in FIG. 7.

Referring now to FIGS. 6, 7 and 8, a further embodiment of the invention is shown for forming an extrusion die for producing L-shaped cellular structures. To form the arrangement of L-shaped pins 218 shown in FIG. 7, the discharge slots 14 of the die 10 are selectively blocked off as shown in FIG. 8 by a plurality of tab members 220. As shown in FIG. 6, each tab member 220 has a pair of insert portions 221 and 222 positioned at right angles to each other and an attachment portion 224 for overlying the outlet face 16 of selected die pins 18. The tabs 220 are secured to the pins 18 by welding, brazing or otherwise suitably bonding the attachment portion 224 to the outlet face 16 of such pins.

Figure 10:
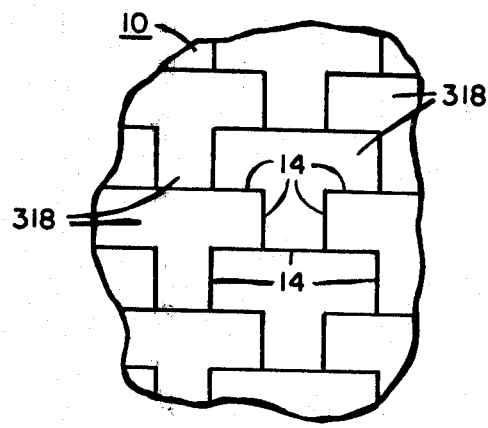
FIG. 10 is a fragmental schematic view of an outlet face of a die for forming a honeycomb structure with T-shaped cells.
Figure 9:
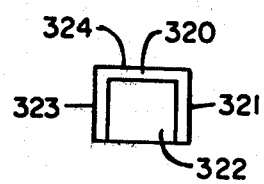
FIG. 9 is an end elevational view of a tab member forming a further embodiment of the present invention.
Figure 11:
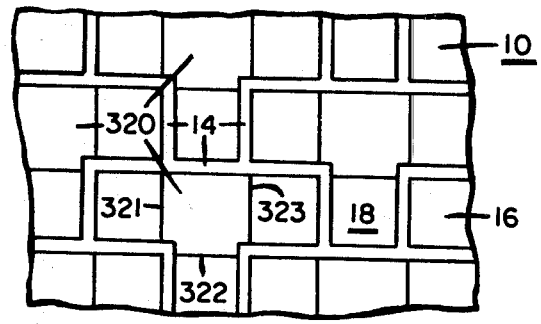
FIG. 11 is a fragmental plan view of the outlet face of a die such as shown in FIG. 3 having a plurality of tabs as shown in FIG. 9 positioned therein to form a discharge outlet having the configuration of FIG. 10.

Referring now to FIGS. 9, 10 and 11, a further embodiment of the invention is shown for forming T-shaped die pins 318 by selectively positioning a plurality of tab members 320 in the discharge slots 14 of die 10 as shown in FIG. 11. The tab members 320 each have 3 insert portions 321, 322, 323 which project at right angles from attachment portion 324. By positioning the tab members 320 within the discharge slots 14 of die 10 in the manner shown in FIG. 11, the pins are in effect converted to the T-shaped pins 318 shown in FIG. 10 for providing an extrusion die for forming honeycomb structures with T-shaped cells. The attachment portions 324 of the tabs 320 are secured to the outlet face 16 of the pins 18 in the manner previously described with regard to tabs 20 and 220.

Figure 12:
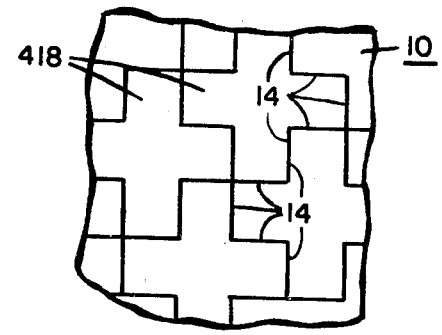
FIG. 12 is a fragmental schematic illustration of the discharge slots in an outlet face of an extrusion die for forming a honeycomb structure with +-shaped cells.
Figure 13:
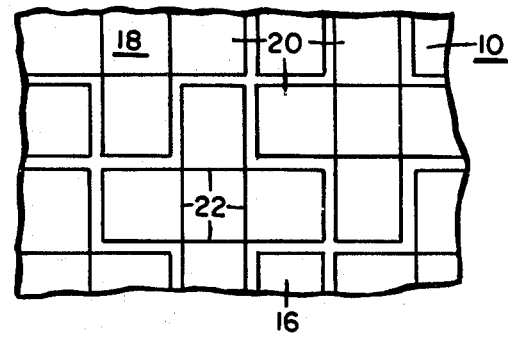
FIG. 13 is a plan view of the outlet face of a die such as shown in FIG. 3 having a plurality of tabs as shown in FIG. 2 positioned therein to provide discharge outlet as shown in FIG. 12 for forming +-shaped cellular configurations in a honeycomb structure.

Referring now to FIGS. 12 and 13, a further embodiment of the invention is disclosed for converting die 10 from square-shaped pins 18 to +-shaped die pins 418 as shown in FIG. 12 by selectively positioning a plurality of tab members 20 in the discharge slots 14 of die 10 as shown in FIG. 13. If desired, a combination of tabs 20 and 220 or 20 and 320 could be utilized to selectively close off the discharge slots 14 to provide the +-shape configuration of FIG. 12, however for ease in production, it is preferred to utilize only one type of tab member per die conversion.

The tabs may be made of any suitable material such as 304 stainless steel which will withstand the pressures and abrasion experienced during extrusion. The width of each insert portion of the tabs should not exceed the width of the pins to which they are attached, so as to only block off that portion of the discharge slot commensurate with and adjacent to the pin within which the insert portion is positioned. Further, the thickness of the insert portion should be substantially equal to the thickness of the discharge slot so as to permit the insertion of the insert portion within the slot and prevent the flow of extrudable material therethrough. In order so as not to overlap discharge slots, the length and width of the attachment portion of the tabs should not exceed the outlet face of the die pins, however the length of the insert portion may be less than, equal to or longer than the length of the attachment portion, since its only function is to prevent flow through that portion of the discharge slot which is blocked off by the insert portion.

As a specific illustration, an extrusion die similar to that shown in FIG. 1 having 0.065" square die pins with interconnected discharge slots having a thickness of 0.010" for forming a honeycomb structure having 200 square cells per square inch was converted to a die similar to that shown in FIG. 4 having die pins of 0.065"×0.140" with 0.010" slots therebetween to form an extruded honeycomb structure having 100 flexible rectangle cells per square inch. The tabs were made of 304 stainless steel and had an adaptor portion about 0.055" long and about 0.064" wide which had an insert portion extending 90° thereto about 0.160" long and 0.064" wide. The insert portion and the attachment portion had a thickness of about 0.01", and were positioned and oriented on the square cell die as shown in FIG. 5, to thereby form the flexible rectangle configuration. The attachment portion of each tab was resistance welded to the outlet face of the square die pin upon which it was positioned so as to securely retain each tab in place during the extrusion operation.

Although the preferred embodiments of the invention have been set forth in detail, it will be apparent to those skilled in the art that various changes and modifications may be made thereto to convert other forms of dies into desired outlet configurations, without departing from the spirit and scope of the invention as defined in the appended claims.

I claim:

1. An extrusion die for forming honeycomb structures of desired cellular configuration which comprises, a die body having an outlet face, a plurality of interconnected discharge slots communicating with said outlet face, means for feeding batch material to said discharge slots, a plurality of die pins formed in said outlet face intermediate said interconnected discharge slots, means secured to selected die pins for blocking off selected portions of said discharge slots, and said selected portions each being equal to the width of said die pin to which said blocking means is secured and to the thickness of the discharge slot adjacent the width of said pin and thereby provide said interconnected discharge slots with a discharge pattern for forming a honeycomb structure with a desired cellular shape.

2. An extrusion die as defined in claim 1 wherein said means for blocking off selected portions of said discharge slots includes a plurality of tab members, each of said tab members having insertion means positioned within one of said selected portions of said discharge slots between opposing faces of adjacent die pins for blocking off such portion of said discharge slots between said adjacent die pins along the width thereof, and means for securing each said tab member to the outlet face of said selected die pins.

3. An extrusion die as defined in claim 2 which includes each of said tab members having an attachment portion secured to an outlet face of one of said selected pin dies, and each said tab member having at least one insert portion extending from said attachment portion which projects within at least one of said selected portions of said discharge slots so as to block off such selected portion of the discharge slots adjacent said selected die pin and form a discharge pattern for producing honeycomb structures of a desired cellular configuration.

4. An extrusion die as defined in claim 3 wherein the insert portion of each tab member is substantially equal to the width of the die pin to which it is attached, and the thickness of each said insert portion is substantially equal to the thickness of the discharge slot in which it is inserted.

5. An extrusion die as defined in claim 1 wherein said means for blocking off selected portions of said discharge slots includes a plurality of tab members each having a plurality of insert portions which project within a plurality of said selected portions of said discharge slots to block off such selected portions, and each said tab member having a single attachment portion secured to an outlet face of a selected die pin.

* * * * *